(12) United States Patent
Lu et al.

(10) Patent No.: US 9,180,581 B2
(45) Date of Patent: Nov. 10, 2015

(54) AUXILIARY DEVICE FOR MAINTAINING A SCREW UPRIGHT

(71) Applicant: ShenZhen Goldsun Network Intelligence Technology Co., Ltd., Shenzhen (CN)

(72) Inventors: Li-Chin Lu, New Taipei (TW); Jian-Hua Xiang, Shenzhen (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 199 days.

(21) Appl. No.: 14/014,384

(22) Filed: Aug. 30, 2013

(65) Prior Publication Data
US 2014/0165792 A1    Jun. 19, 2014

(30) Foreign Application Priority Data
Dec. 18, 2012 (CN) .......................... 2012 1 0551045

(51) Int. Cl.
*B25B 23/10* (2006.01)
*B23P 19/00* (2006.01)

(52) U.S. Cl.
CPC ............... *B25B 23/10* (2013.01); *B23P 19/006* (2013.01)

(58) Field of Classification Search
CPC ....... B25B 23/10; B23P 19/006; B23B 31/02; Y10T 279/18
USPC .................................. 81/13, 454, 458, 57.37
See application file for complete search history.

(56) References Cited

U.S. PATENT DOCUMENTS

| | | | | |
|---|---|---|---|---|
| 6,672,404 | B2* | 1/2004 | Kamo et al. ..................... | 173/11 |
| 7,980,159 | B1* | 7/2011 | Han ................................. | 81/430 |
| 8,051,750 | B2* | 11/2011 | Zhou et al. ...................... | 81/452 |
| 2013/0264783 | A1* | 10/2013 | Maiwald et al. ............... | 279/106 |

* cited by examiner

*Primary Examiner* — David B Thomas
(74) *Attorney, Agent, or Firm* — Novak Druce Connolly Bove + Quigg LLP

(57) ABSTRACT

An auxiliary device includes a base, two rotatable arms, and an elastic member. The two arms are rotatably connected to the base and each includes a mating surface that defines a recess. The recesses of the two arms cooperatively form a through hole when the mating surface is in contact with each other. The through hole includes, from top to bottom, a first tapered hole portion, an annular groove, a second tapered hole portion, and a round hole portion. The annular groove is used to receive a head of a screw, and the round hole portion has a lateral surface is used to contact a shank of the screw to keep the screw upright. The elastic member is arranged between the two rotatable arms and applies a pushing force to the two rotatable arms.

5 Claims, 4 Drawing Sheets

AUXILIARY DEVICE FOR MAINTAINING A SCREW UPRIGHT

BACKGROUND

1. Technical Field

The present disclosure relates to an auxiliary device for maintaining a screw upright prior to the screw being turned and engaged in a hole.

2. Description of Related Art

Some tablet computers include a magnet for attracting an external protective cover. In manufacturing such tablet computers, it is found that the magnet may attract a screw that is ready to be screwed into two components of the tablet computer, and cause the screw to deflect. The threaded hole of the two components may be damaged if the deflected screw is then turned by an electric screwdriver.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
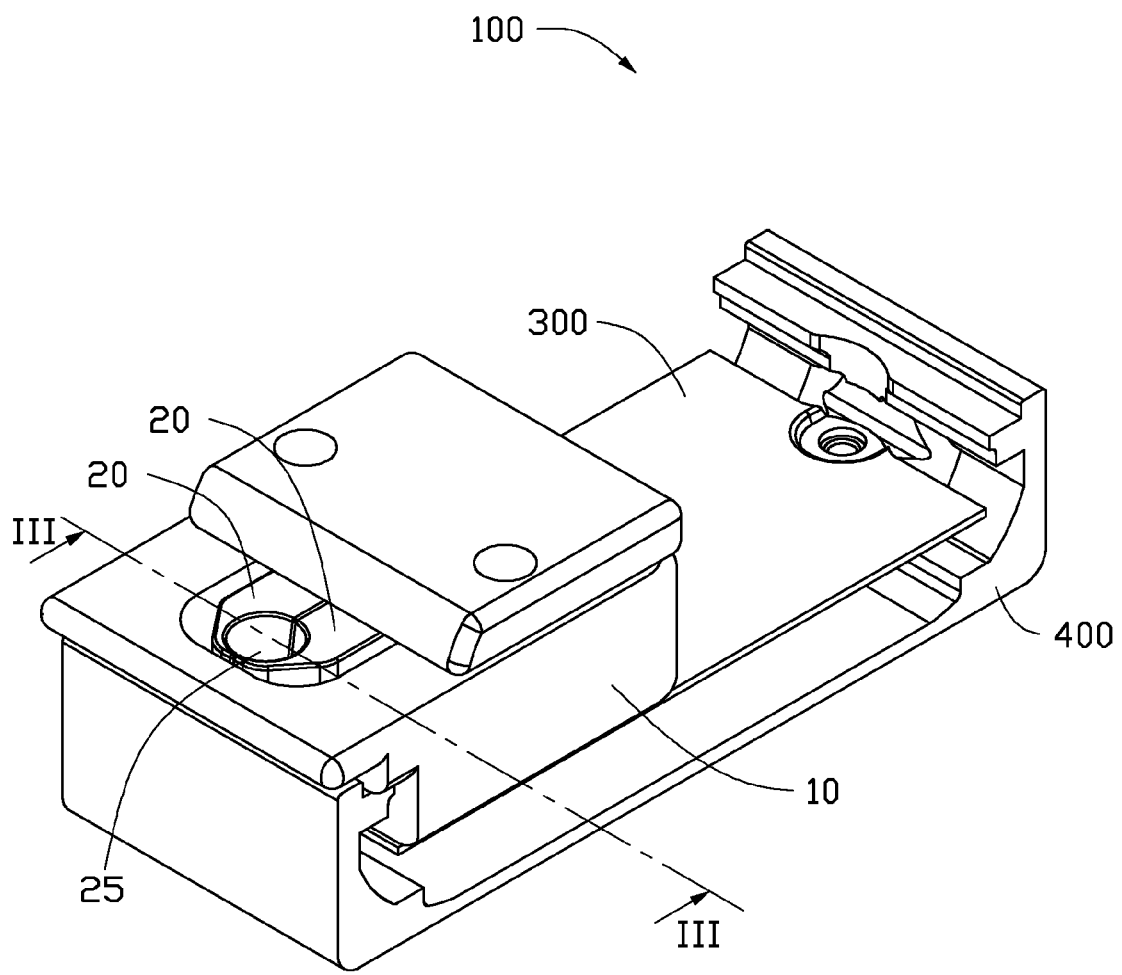
FIG. 1 is an isometric view of an auxiliary device for maintaining a screw upright according to one embodiment, showing the auxiliary device placed on a first workpiece that is to be connected to a second workpiece by the screw.
Figure 2:
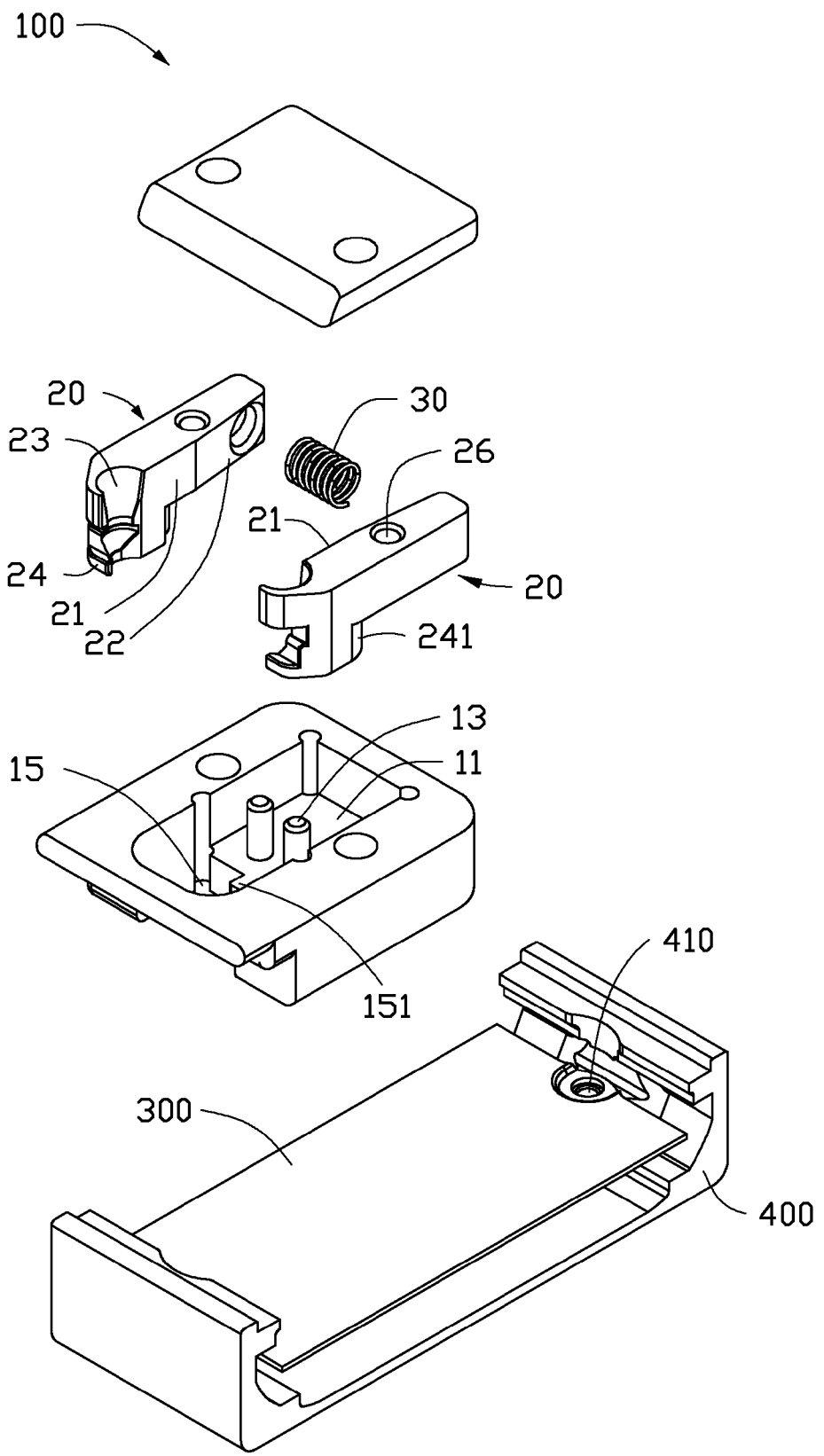
FIG. 2 is an exploded view of the auxiliary device of FIG. 1.
Figure 3:
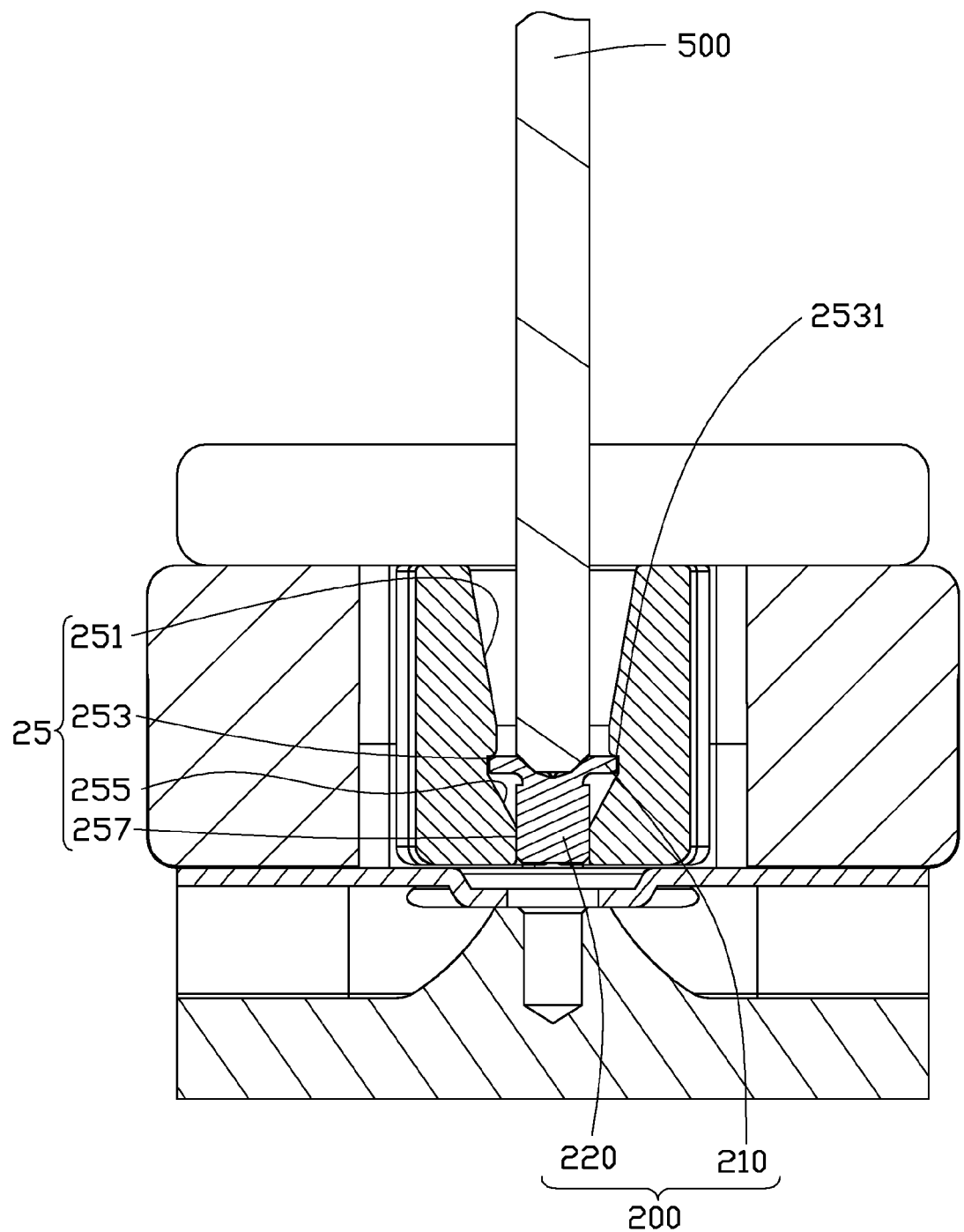
FIG. 3 is a cross-sectional view of the auxiliary device and workpieces of FIG. 1, corresponding to line III-III thereof, and also showing the screw and part of a screwdriver.

Referring to FIGS. 1-3, a metallic screw 200 connects a first workpiece 300 to a second workpiece 400. The second workpiece 400 includes a magnet. When the screw 200 is initially placed on the workpiece 400 and aligned with either of two threaded holes 410 of the workpiece 400, it is found that the magnet may cause the screw 200 to deflect. When this happens, the subsequent turning of the screw 200 by an electric screwdriver is liable to be problematic. An auxiliary device 100 for maintaining the screw 200 upright will now be described in detail.

The auxiliary device 100 includes a base 10, and two rotatable arms 20 rotatably connected to the base 10. An elastic member 30 (e.g., a coil spring) is arranged between and applies a pushing force to the two rotatable arms 20, and thereby the two rotatable arms 20 are normally biasedly in contact with each other. In the embodiment, each rotatable arm 20 includes a planar mating surface 21 that defines a recess 23. The two mating surfaces 21 are normally in contact with each other, and the two recesses 23 cooperatively form a through hole 25.

In the embodiment, the through hole 25 includes, from top to bottom, a first tapered hole portion 251, an annular groove 253, a second tapered hole portion 255, and a round hole portion 257. The diameter of the first tapered hole portion 251 decreases gradually from top to bottom. The smallest diameter of the first tapered hole portion 251 is less than the diameter of a head 210 of the screw 200. The diameter of the annular groove 253 is greater than the diameter of the head 210, thereby allowing the head 210 to be received in the annular groove 253. A narrow top surface 2531 of the annular groove 253 abuts against the top of the head 210, which prevents the screw 200 from moving up.

The diameter of the second tapered hole portion 255 decreases gradually from top to bottom. The round hole portion 257 includes a lateral, cylindrical surface that is in contact with a shank 220 of the screw 200.

When in use, the auxiliary device 100 is placed on the first workpiece 300, with the through hole 25 aligned with one of the threaded holes 410 of the second workpiece 400. An operator then puts the screw 200 into the through hole 25, and presses the screw 200 with an electric screwdriver 500. The screw 200 moves down and the head 210 first contacts the lateral surface of the first tapered hole portion 251. The head 210 urges the two rotatable arms 20 to separate slightly from each other. The head 210 then moves into the annular groove 253, with the shank 220 staying in contact with the cylindrical surface of the round hole portion 257. The shank 220 is thus upright and aligned with the threaded hole 410. The user then starts the electric screwdriver 500 to turn the screw 200 into the threaded hole 410.

In the embodiment, the base 10 defines a chamber 11 that receives the two rotatable arms 20. Two rods 13 protrude from a bottom wall of the chamber 11, and each rotatable arm 20 defines a rod receiving hole 26. The two rods 13 are received in the rod receiving holes 26, thereby rotatably connecting the two rotatable arms 20 to the base 10.

In the embodiment, each rotatable arm 20 includes a main body 22 and a protrusion 24 protruding from a lower surface of the main body 22. The through hole 25 passes through both the main body 22 and the protrusion 24. The chamber 11 includes a sunken portion 15 in the bottom thereof, and the sunken portion 15 receives the protrusions 24 of the rotatable arms 20.

Figure 4:
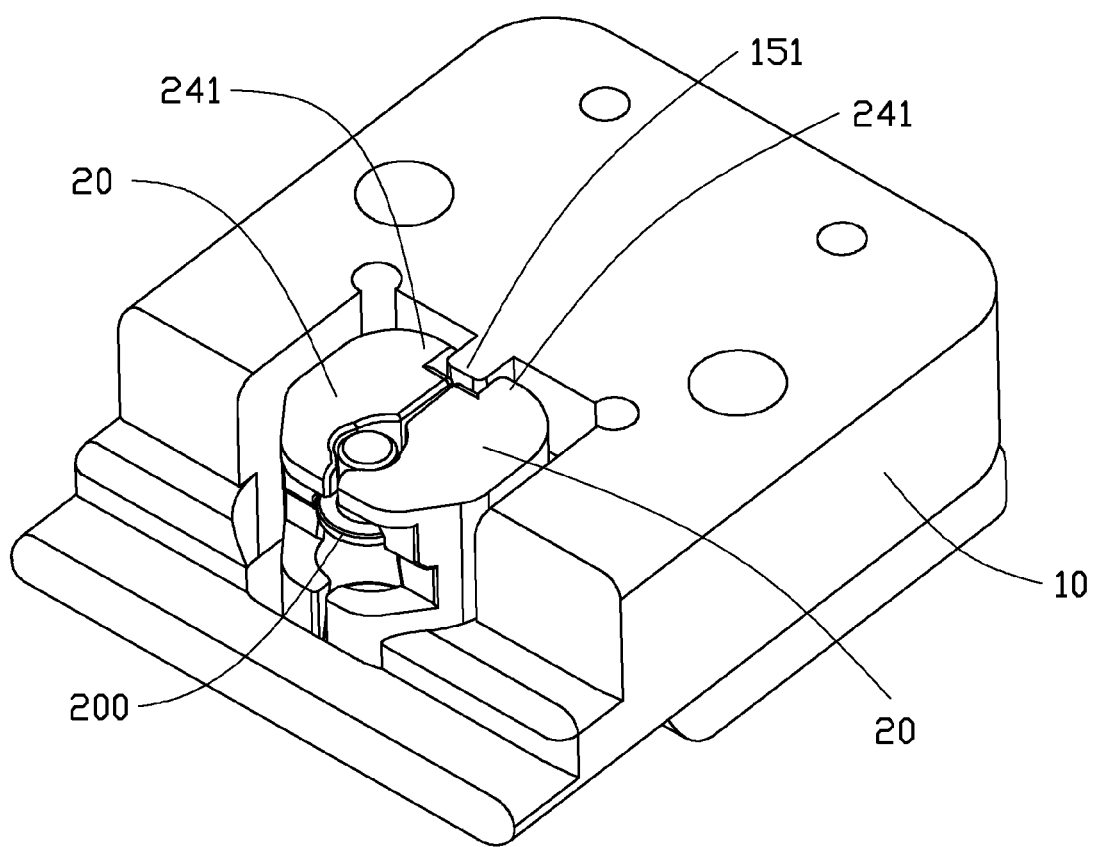
FIG. 4 is an isometric view of the auxiliary device of FIG. 1, showing the auxiliary device inverted and the screw inside the auxiliary device.

Referring to FIG. 4, each protrusion 24 includes a block 241 extending from a rear lateral surface thereof. The base 10 includes a projecting portion 151 projecting from a rear surface of the chamber 11 at the sunken portion 15. The blocks 241 contact the projecting portion 151 if the rotatable arms 20 separate too far away from each other. Thereby, the two rotatable arms 20 are prevented from rotating too far.

While various embodiments have been described and illustrated, the disclosure is not to be construed as being limited thereto. Various modifications can be made to the embodiments by those skilled in the art without departing from the true spirit and scope of the present disclosure.

What is claimed is:

1. An auxiliary device for maintaining a screw upright, the auxiliary device comprising:

a base;

two rotatable arms rotatably connected to the base, each rotatable arm comprising a mating surface that defines a recess, the recesses of the rotatable arms cooperatively forming a through hole, the through hole comprising, from top to bottom, a first tapered hole portion, an annular groove, a second tapered hole portion, and a round hole portion, wherein the annular groove is configured to receive a head of a screw, and the round hole portion comprises a lateral surface that is configured to contact a shank of the screw to keep the screw upright; and an elastic member arranged between the rotatable arms and applying pushing force to the rotatable arms thereby biasing the rotatable arms together.

2. The auxiliary device according to claim 1, wherein the base defines a chamber that receives the rotatable arms, two rods protrude from a bottom wall of the chamber, each rotatable arm defines a rod receiving hole, and the two rods are received in the rod receiving holes, thereby rotatably connecting the rotatable arms to the base.

3. The auxiliary device according to claim 2, wherein each rotatable arm comprises a main body and a protrusion protruding from a lower surface of the main body, the through hole passes through both the main bodies and the protrusions of the rotatable arms, the chamber includes a sunken portion in a bottom thereof, and the sunken portion receives the protrusions of the rotatable arms.

4. The auxiliary device according to claim 3, wherein each protrusion comprises a block extending from a lateral surface thereof, the base comprises a projecting portion projecting from a side surface of the sunken portion, the blocks of the two rotatable arms are configured to contact the projecting portion, thereby preventing the two rotatable arms from rotating.

5. The auxiliary device according to claim 1, wherein the elastic member is a coil spring.

\* \* \* \* \*